United States Patent
Watanobe

(10) Patent No.: US 6,237,425 B1
(45) Date of Patent: *May 29, 2001

(54) KÁRMÁN VORTEX FLOW METER

(75) Inventor: Akiko Watanobe, Tokyo (JP)

(73) Assignee: Kabushiki Kaisha Saginomiya Seisakusho, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/146,253

(22) Filed: Sep. 3, 1998

(51) Int. Cl.[7] .................................................. G01F 1/32
(52) U.S. Cl. ............................................... 73/861.22
(58) Field of Search .......................... 73/861.22, 861.23, 73/861.24, 861.18

(56) References Cited

U.S. PATENT DOCUMENTS

| | | | | |
|---|---|---|---|---|
| 4,285,247 | * | 8/1981 | Klobe | 73/861.24 |
| 4,627,295 | * | 12/1986 | Matsubara et al. | 73/861.24 |
| 4,706,503 | * | 11/1987 | Kamenster | 73/861.24 |
| 4,776,222 | * | 10/1988 | Lew | 73/861.22 |
| 4,862,750 | * | 9/1989 | Nice | 73/861.24 |

FOREIGN PATENT DOCUMENTS 56-9654  3/1981 (JP).

* cited by examiner

*Primary Examiner*—Max Noori
*Assistant Examiner*—Jagdish Patel
(74) *Attorney, Agent, or Firm*—McDermott, Will & Emery

(57) ABSTRACT

A Kármán vortex flowmeter includes a vortex generator 2 provided in a tube-like flow passage 1a, a vortex detector 4 having a piezoelectric element 6 embedded in an elastic sheath 5 having a pressure receiving wing piece 5a, spaced apart by a prescribed distance from the vortex generator, downstream of the flow passage. The vortex detector includes the pressure receiving wing piece of a square plate, and a piezoelectric element accommodating portion 5c of a circular cylinder having a larger outer diameter than the pressure receiving wing piece. The pressure receiving wing piece protrudes from an end face 5c of the piezoelectric element accommodating portion. In this configuration, a Kármán vortex flowmeter with high accuracy can be provided in which the detector itself generate no vortex and can detect vortexes stably.

2 Claims, 5 Drawing Sheets

KÁRMÁN VORTEX FLOW METER

BACKGOURD OF THE INVENTION

1. Field of the Invention

The present invention relates to a Kármán vortex flowmeter for measuring the flow rate of fluid such as water.

2. Description of the Prior Art

Generally, a Kármán vortex occurs in the downstream in fluid flowing at a uniform speed. By detecting the frequency of the Kármán vortex, the flow velocity of the fluid can be measured. An example of the device for measuring the flow velocity or flow rate of the fluid using such a technique is disclosed in Japanese Patent Publn. 56-9654.

An example of previously known Kármán vortex flowmeters is shown in FIGS. 7 and 8. A Kármán vortex flowmeter, generally F', includes a flowmeter body 1, vortex generator 2, vortex detector 4, elastic sheath 15, piezoelectric element 16, etc.

A flow passage 1a having a circular sectional passage is formed to pass through the interior of the body 1, and fluid passes along the flow passage 1a in a direction of X. A flat region 1b is formed at a part of the outer wall of the flowmeter body 1. In the flat area 1b, a first hole 1b1 and a second hole 1b2 which communicate with the flow passage 1a are formed. The first hole 1b1 is located upstream.

The vortex generator 2 has an outer shape of a square pole and includes a shaft portion 2a and a head portion 2b fitting in the first hole 1b1 and engaged with the flat region 1b. The shaft portion 2a is inserted in the flow passage 1a from the first hole 1b1. A temperature-sensitive element 3, which is embedded in the shaft portion 2a of the vortex generator 2, serves to detect the fluid flowing through the flow passage 1a. The temperature signal detected by the temperature-sensitive element 3 is derived through a lead wire 3a.

The vortex detector 4 includes an insulating elastic sheath 15 and a piezoelectric element 16. A pressure-receiving wing piece 15a of the elastic sheath 15 is inserted in the flow passage 1a from the second hole 1b2.

The elastic sheath 15 is formed of elastic synthetic resin, and includes the pressure receiving wing piece 15a and a head portion 15b. The pressure receiving wing piece 15a hangs over upstream and downstream from the flow passage 1a. The head portion 15b is fit into the second hole 1b2 and engaged with the flat region 1b. Such an elastic sheath 15 is shown in FIG. 9. The pressure receiving wing piece 15a is integrally formed with a piezoelectric element accommodating portion 15c which is also integrally formed with the head portion 15b which is a circular cylinder. The lower end 15c1 of the piezoelectric element accommodating portion 15c is flush with the lower end 15a1 of the pressure receiving wing piece 15a.

As shown in FIGS. 7 and 8, the piezoelectric element 16 is a bimorph type element which is embedded in the piezoelectric element accommodating portion 15c of the elastic sheath 15 with a thermosetting insulating elastic epoxy resin 7. A detected signal is externally derived through a lead wire 16a.

A cover 8 is attached to the flat region 1b by means of a thread locker. The cover 8 includes a first thread hole 8a1 corresponding to the first hole 1b1 and a second thread hole 8a2 corresponding to the second hole 1b2.

A first ring body 9A is threaded with the first thread hole 8a1 to bring the head portion 2b of the vortex generator body 2 into intimate contact with the flat region 1b through packing 10A, thus preventing fluid leakage. A second ring body 9B is threaded with the first thread hole 8a2 to bring the head portion 15b of the elastic sheath 15 into intimate contact with the flat region 1b through packing 10B, thus preventing fluid leakage.

An explanation will be given of the operation of the flowmeter F' having the above configuration.

The vortex generator 2 generates the Kármán vortex in the fluid flowing in the direction of X through the flow passage 1a of the flowmeter body 1. The Kármán vortex thus generated moves toward the vortex detector 4, and alternately passes both sides of the pressure wing piece 15a of the elastic sheath 15. Thus, every time the Kármán vortex passes, electric charges are generated in the piezoelectric element 16 owing to distortion force.

Therefore, the flow rate of the fluid can be measured in such a manner that the electric charges generated in the piezoelectric element 16 are derived through the lead wire 16a as a detected signal, the detected signal is converted into a square wave signal corresponding to a vortex frequency by a wave shaping circuit, for example, and the square wave signal is converted into a flow rate indicating output signal by a coefficient circuit or a control signal to a flow rate control device.

The temperature signal detected by the temperature-sensitive element 3 embedded in the vortex generator 2 can be used as a signal for recognizing the fluid density or fluid viscosity. Further, the temperature signal as well as the flow rate indicating output is supplied to an arithmetic unit to provide a thermal flow rate output signal.

However, the conventional vortex flowmeter having the above configuration, the detector itself generates vortexes. Since the vortexes thus generated interfere with the vortexes to be detected, the detector cannot stably detect vortexes, thus deteriorating measurement accuracy.

SUMMARY OF THE INVENTION

The present invention has been accomplished in view of the problem involved with the above Kármán vortex flowmeter, and intends to provide a Kármán vortex flowmeter with high measurement accuracy capable of reducing the vortex to be generated by the detector itself to detect a vortex stably.

The invention defined in claim 1 is a Kármán vortex flowmeter comprising a vortex generator provided in a tube-like flow passage, a vortex detector having a piezoelectric element embedded in an elastic sheath having a pressure receiving wing piece, spaced apart by a prescribed distance from the vortex generator, downstream of the flow passage, wherein the vortex detector includes the pressure receiving wing piece of a square plate, and a piezoelectric element accommodating portion of a circular cylinder having a larger outer diameter than the pressure receiving wing piece, the pressure receiving wing piece protruding from an end face of the piezoelectric element accommodating portion.

The invention defined in claim 2 is characterized in that a rate of a protruding length of the pressure receiving wing piece to a total of a length of the piezoelectric element accommodating portion in an axial direction and a protruding length of the pressure receiving wing piece is 0.05–0.6.

In accordance with the invention defined in claims 1 and 2, the vortex detector of the Kármán vortex flowmeter includes the pressure receiving wing piece of a square plate, and a piezoelectric element accommodating portion of a circular cylinder having a larger outer diameter than the pressure receiving wing piece, the pressure receiving wing piece protruding from an end face of the piezoelectric element accommodating portion.

Therefore, the Kármán vortex flowmeter according to the present invention can reduce the number of vortexes and detect vortexes stably.

DESCRIPTION OF THE PREFERRED EMBODIMENTS

Figure 1:
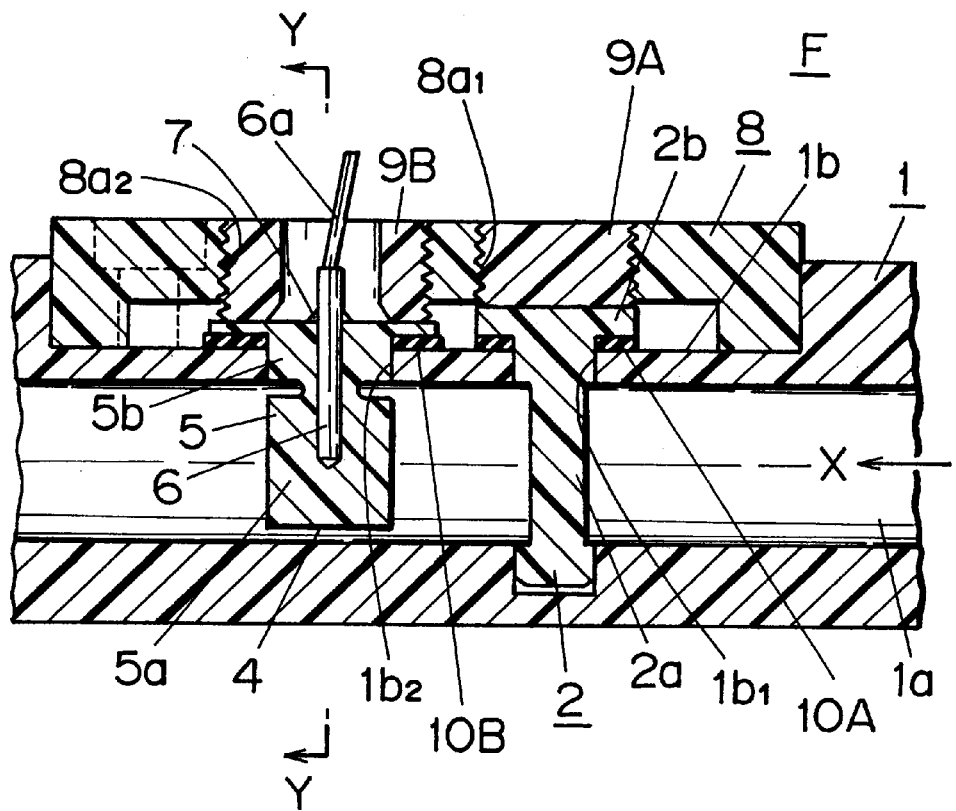
FIG. 1 is a longitudinal sectional view showing an embodiment of the Kármán vortex flowmeter according to the present invention.

Now referring to the drawings, an explanation will be given of an embodiment of the Kármán vortex flowmeter according to the present invention.

Figure 2:
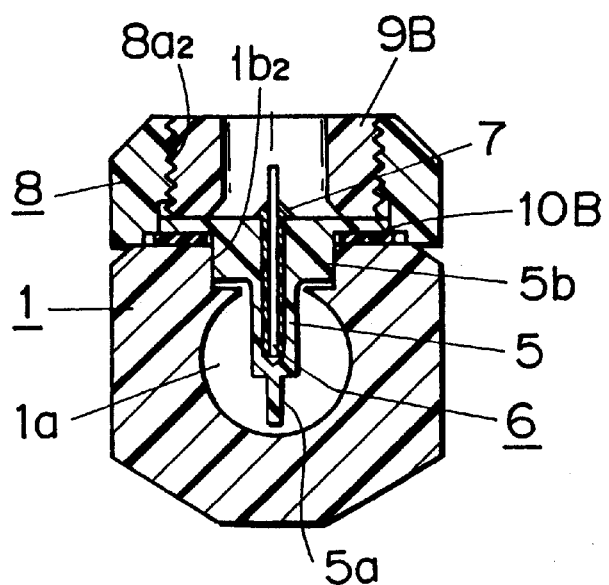
FIG. 2 is a sectional view taken in line Y—Y in the Kármán vortex flowmeter shown in FIG. 1.
Figure 7:
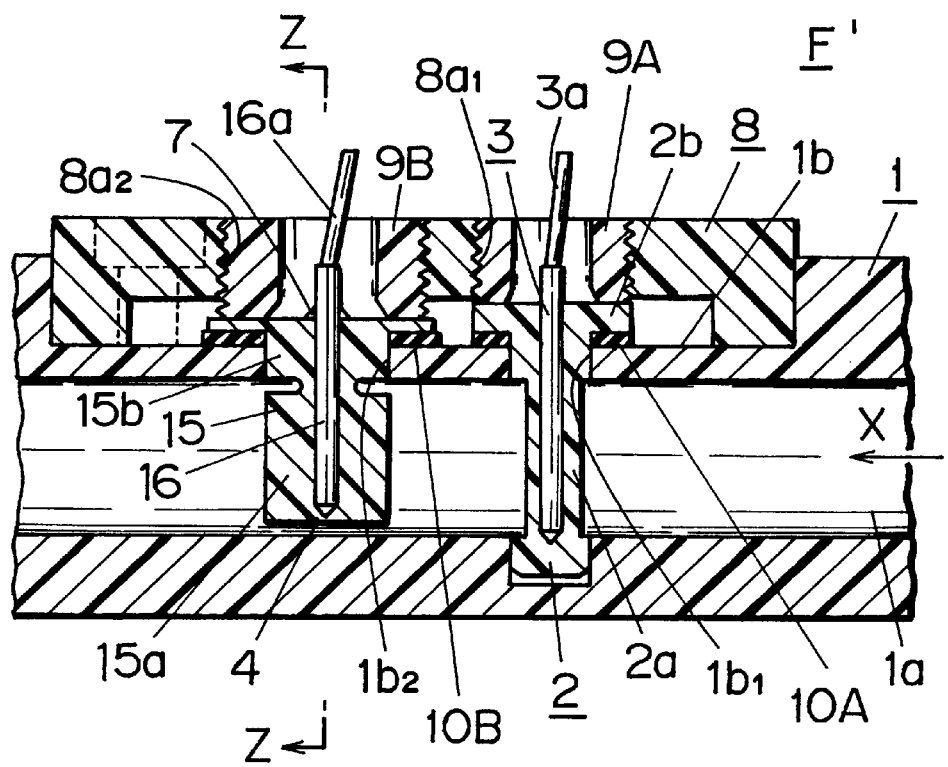
FIG. 7 is a longitudinal sectional view of the Kármán vortex flowmeter according to the prior art.
Figure 8:
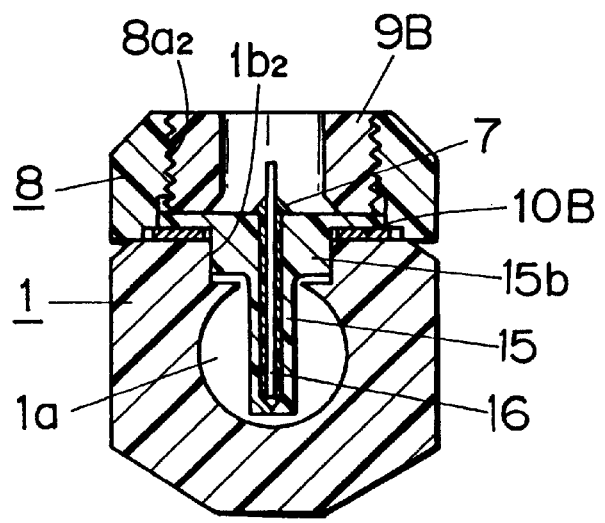
FIG. 8 is a sectional view taken in line Z—Z in the Kármán vortex flowmeter shown in FIG. 7.
Figure 9A:
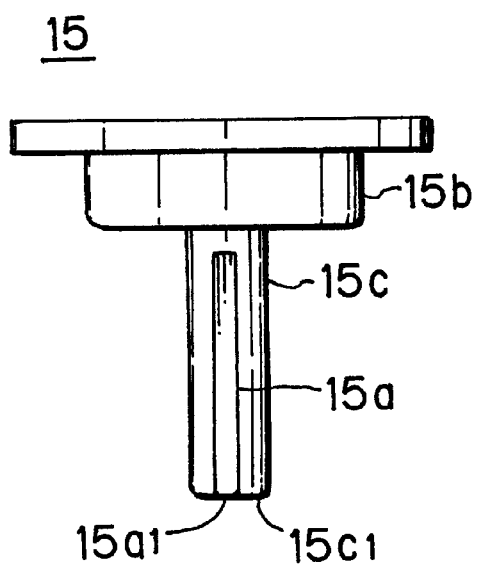
FIGS. 9A and 9B are a front view and a side view of an elastic sheath of the Kármán vortex flowmeter shown in FIG. 7.
Figure 9B:
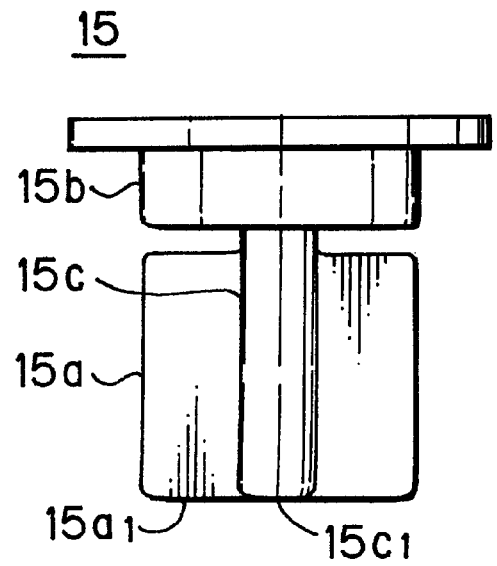

An embodiment of the Kármán vortex flowmeter according to the present invention is shown in FIGS. 1 and 2. A flowmeter, generally F, includes a flowmeter body 1, vortex generator 2, vortex detector 4, elastic sheath 5, piezoelectric element 6, etc. In the flowmeter F shown in FIGS. 1 and 2, like reference symbols refer to like elements of the flowmeter F' shown in FIGS. 7–9.

The flowmeter body 1 and vortex generator 2 are the same as those in the prior art. Further, as in the prior art, the vortex detector 4 includes an insulating elastic sheath 5 and a piezoelectric element 6. A pressure-receiving wing piece 5a of the elastic sheath 5 is inserted in the flow passage 1a through the second hole 1b2.

An explanation will be given of the shape of the elastic sheath 5 which is a feature of the present invention.

Figure 3A:
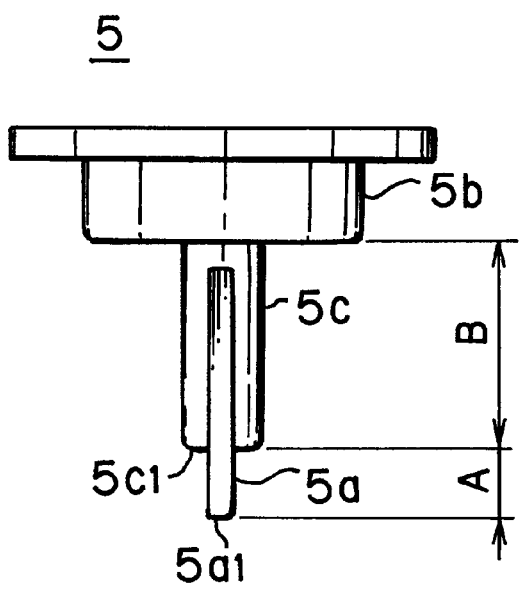
FIGS. 3A and 3B are a front view and a side view of an elastic sheath of the Kármán vortex flowmeter.
Figure 3B:
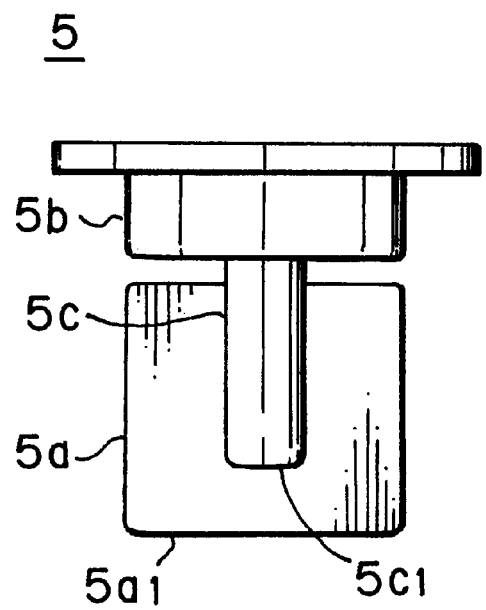

The elastic sheath 5 includes the pressure receiving wing piece 5a and a head portion 5b. The pressure receiving wing piece 5a hangs over upstream and downstream from the flow passage 1a. The head portion 5b is fit into the second hole 1b2 and engaged with the flat region 1b. Such an elastic sheath 5 is shown in FIGS. 3A and 3B. The pressure receiving wing piece sa is integrally formed with a piezoelectric 10 element accommodating portion 5c which is also integrally formed with the head portion 5b. The lower end 5a1 of the pressure receiving wing piece 5a protrudes from the lower end 5c1 of the piezoelectric element accommodating portion 5c.

As shown in FIG. 3A, assuming that the length of the piezoelectric accommodating portion 5c is B, and the protruding length of the lower end 5a1 of the pressure receiving wing piece 5a from the lower end 5c1 of the piezoelectric element accommodating portion is A, the ratio R=A/(A+B) is set for 0.05–0.6.

As shown in FIGS. 1 and 2, the piezoelectric element 6 is a bimorph type element as in the prior art, which is embedded in the axial line portion of the elastic sheath 5, i.e. pressure-receiving wing piece 5a and head portion 5b with a thermosetting insulating elastic epoxy resin 7. A detected signal is externally derived through a lead wire 6a. As in the prior art, the elements of the cover 8, the first ring body 9A, second ring body 9B, etc. are also provided.

The flowmeter F having the configuration described above also measures the flow rate in such a manner that the vortex detector 4 detects the Kármán vortexes generated in the fluid flowing through the flow passage 1a of the flowmeter body 1 by the vortex generator 2.

Figure 4:
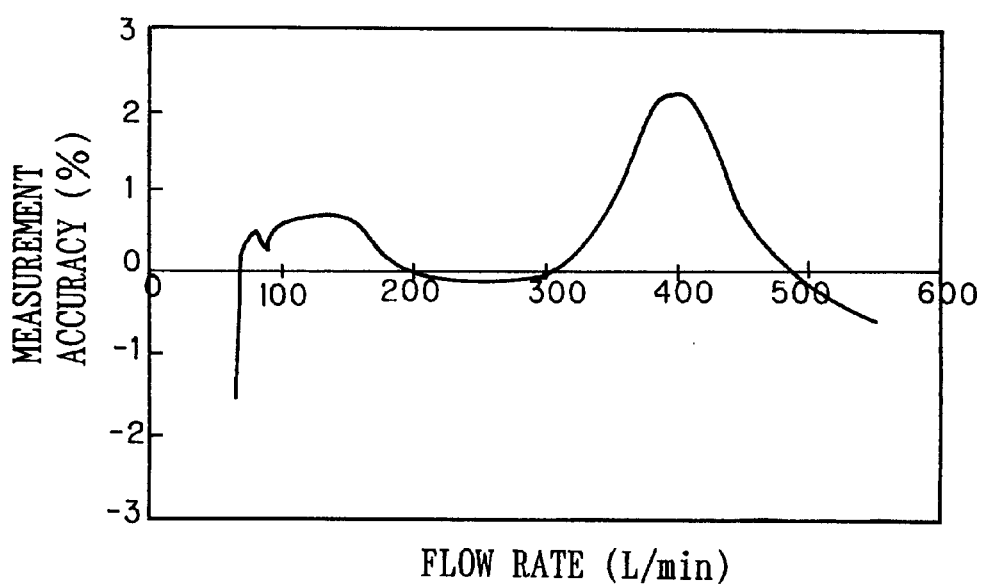
FIG. 4 is a graph showing a relationship of a flow rate versus measurement accuracy in the Kármán vortex flowmeter according to a prior art and the present invention.
Figure 5:
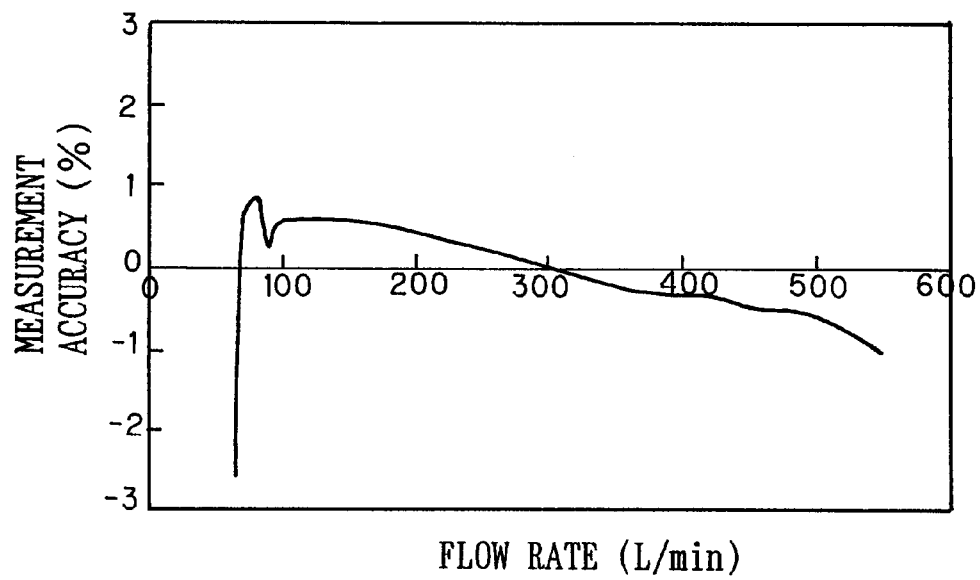
FIG. 5 is a graph showing a relationship of a flow rate versus measurement accuracy in the Kármán vortex flowmeter according to the present invention.
Figure 6:
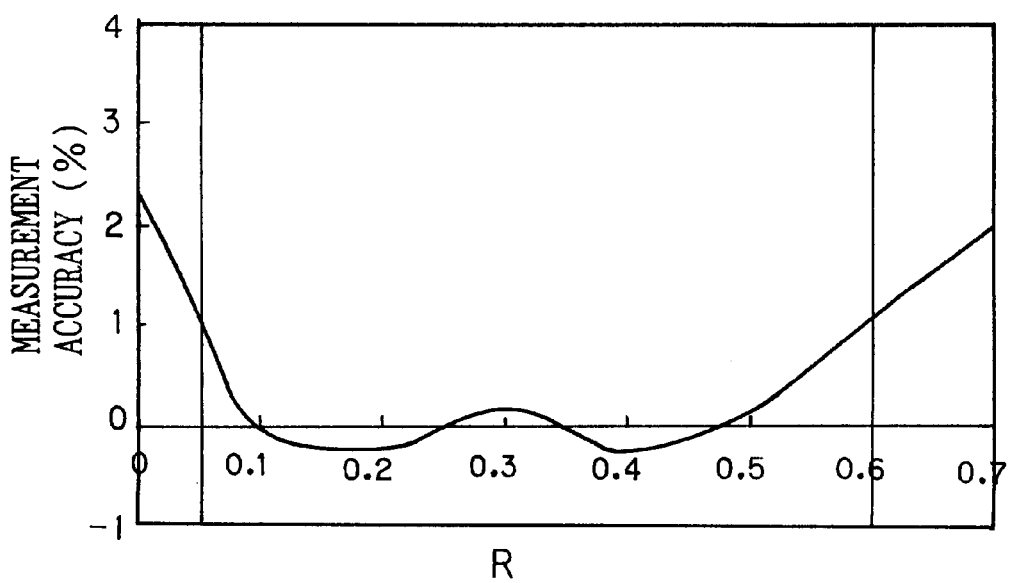
FIG. 6 is a graph showing a relationship of measurement accuracy versus a rate of a protruding length of the pressure receiving wing piece to a total of a length of the piezoelectric element accommodating portion and a protruding length of the pressure receiving wing piece from the end face of the piezoelectric element accommodating portion.

Referring to FIGS. 4–6, an explanation will be given of the measuring accuracy of the flowmeter F according to the present invention having the above configuration.

FIG. 4 is a graph showing the relationship between the flow rate and the measuring accuracy when the rate R<0.05 and R>0.6. The measuring accuracy was calculated from comparison between the values measured by the Kármán vortex flowmeter and their calculated values when a prescribed amount of water is caused to flow for a prescribed time at a flow velocity of about 1.0–5.0 m/s in a tube having a diameter of 48 mm using water at room temperature as fluid.

As apparent from the graph of FIG. 4, in the range of the flow rate from about 100 L/min to about 350 L/min, the measurement accuracy is within about 1%. However, in the range from about 350 L/min to about 450 L/min, the measurement accuracy exceeds about 1%, and particularly at the flow rate of about 400 L/min, it deteriorates to about 2%.

On the other hand, FIG. 5 is a graph showing the relationship between the flow rate and the measuring accuracy when 0.05≦R≦0.6. The measuring condition is the same as the case of FIG. 4. As apparent from the graph of FIG. 5, in the range of the flow rate from about 100 L/min to about 500 L/min, the measurement accuracy is within about ±0.5% that is preferable accuracy.

FIG. 6 is a graph showing the measuring accuracy resulted when R is varied, the water at room temperature is caused to flow at a flow velocity of about 3.7 m/s and flow rate of about 400 L/min in a tube having a diameter of 48 mm. It can be seen from the graph of FIG. 6 that the range of R from 0.05 to 0.6 provides a preferable measurement accuracy within ±1.0.

In accordance with the inventions defined in claims 1 and 2, the vortex detector itself generates no vortex and can detect vortexes stably, thus providing a Kármán vortex flowmeter with high measurement accuracy.

What is claimed is:

1. A Kármán vortex flowmeter comprising:
   a vortex generator disposed in a tube-like flow passage; and a vortex detector spaced apart a prescribed distance downstream from the vortex generator, said vortex detector including
   a head section positioned outside the tube-like flow passage and having a lower edge portion,
   a cylindrical piezoelectric element holder section integrally formed with the head section and protruding from the lower edge portion of the head section into the tube-like flow passage in a direction perpendicular to a direction of flow in the tube-like flow passage, and
   a pressure receiving wing integrally formed with the cylindrical piezoelectric element holder section, said pressure receiving wing
      (i) being a plate having an essentially square shape,
      (ii) having an upper wing edge and a lower wing edge,
      (iii) being entirely within said flow passage and overhanging outwardly from said cylindrical piezoelectric element holder section both upstream and downstream the direction of flow in the tube-like flow passage,
      (iv) having the upper wing edge positioned upwardly apart from the lower end portion of said cylindrical piezoelectric element holder section and downwardly apart from the lower edge portion of the head section from which the cylindrical piezoelectric element holder section protrudes into the tube-like flow passage, and
      (iv) having the lower wing edge protruding a predetermined length from the lower end portion of said cylindrical piezoelectric element holder section.

2. The Kármán vortex flowmeter according to claim 1, wherein A/(A+B) is in a range from 0.05 to 0.6, where A is the predetermined length the lower wing edge of the pressure receiving wing protrudes from the lower end portion of said cylindrical piezoelectric element holder section, and B is the length of said cylindrical piezoelectric element holder section in an axial direction.

\* \* \* \* \*